Figure 5:
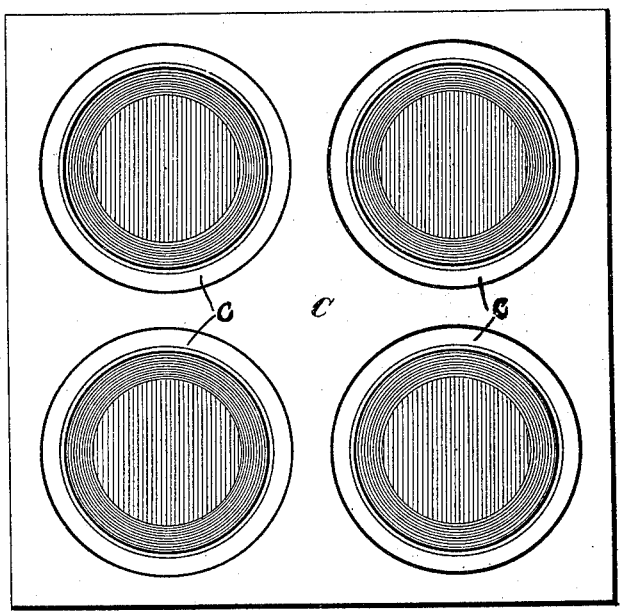

No. 688,162. Patented Dec. 3, 1901.
J. W., R. W. & C. H. L. COMLEY.
PROCESS OF WELDING METALS.
(Application filed Dec. 16, 1897. Renewed May 10, 1901.)
(No Model.) 2 Sheets—Sheet 1.
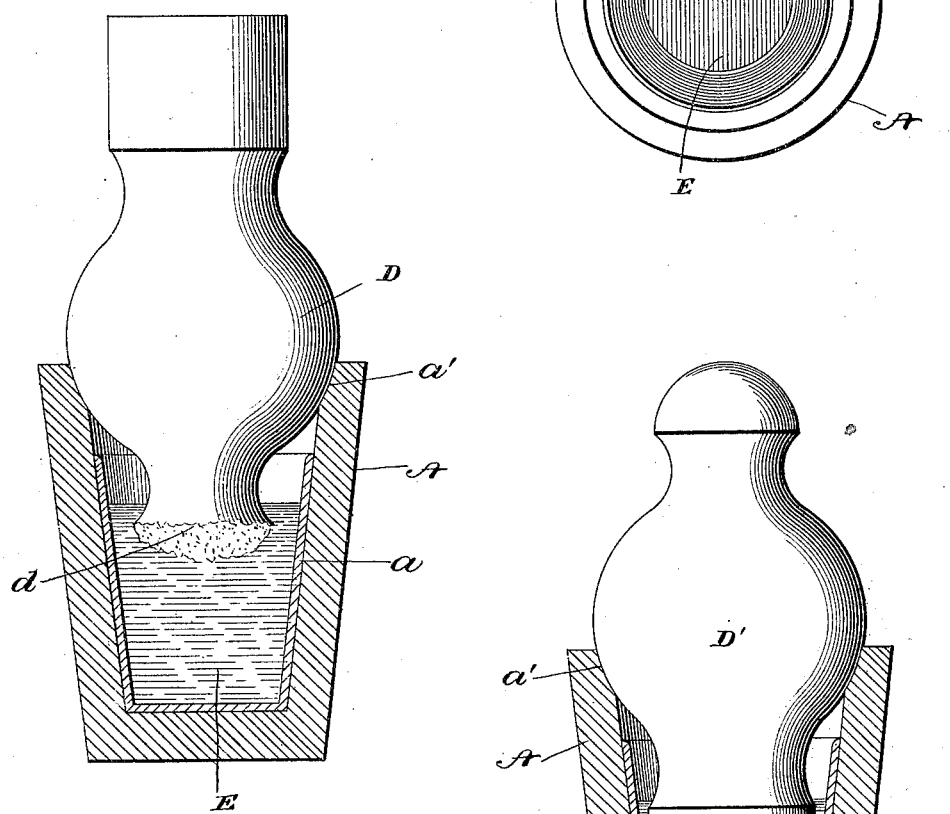

No. 688,162. Patented Dec. 3, 1901.
J. W., R. W. & C. H. L. COMLEY.
PROCESS OF WELDING METALS.
(Application filed Dec. 16, 1897. Renewed May 10, 1901.)

(No Model.) 2 Sheets—Sheet 2.

UNITED STATES PATENT OFFICE.

JOSEPH WILLIAM COMLEY, ROBERT WALLACE COMLEY, AND CHARLES HENRY LARGE COMLEY, OF BRADDOCK, PENNSYLVANIA, ASSIGNORS OF ONE-TWENTIETH TO PATRICK THOMAS COOK, OF HOMESTEAD, PENNSYLVANIA.

PROCESS OF WELDING METALS.

SPECIFICATION forming part of Letters Patent No. 688,162, dated December 3, 1901.

Application filed December 16, 1897. Renewed May 10, 1901. Serial No. 59,682. (No specimens.)

*To all whom it may concern:*

Be it known that we, JOSEPH WILLIAM COMLEY, ROBERT WALLACE COMLEY, and CHARLES HENRY LARGE COMLEY, citizens of the United States, residing at Braddock, in the county of Allegheny and State of Pennsylvania, have invented certain new and useful Improvements in Processes of Welding Metals; and we do hereby declare the following to be a full, clear, and exact description of the invention, such as will enable others skilled in the art to which it appertains to make and use the same.

This invention relates to processes for welding metals adapted to fuse at different temperatures, and particularly copper and steel or iron.

In the use of sledges or hammers of ordinary construction it has been found in working around or repairing machinery that a solid blow with a hammer having a steel or iron face is liable to injure or indent the shafts of engines and other parts of fine machinery, such as locomotives and marine engines, while a copper face, being more soft or yielding, may be used without such injurious results.

The main object of our invention is to provide a process for manufacturing hammers, sledges, and other tools with copper or brass faces or an alloy of copper.

In making a brass or bronze face the process is the same up to the point of applying the iron or steel body to the molten copper, when a suitable alloy is added to the latter, which alloy may consist of one part of tin, two of zinc, and one of lead, with fourteen ounces of copper.

In practicing our invention it is essential that the iron or steel before welding the copper or brass thereto should be thoroughly freed from scale or rust, which may be done by any of the well-known methods in practice for that purpose. The body portion of the hammer or other tool to be united to the copper face being prepared as stated is placed in a suitable receptacle, such as a black-lead crucible, in which it may be subjected to the desired temperature in the fire or furnace, the body being properly covered to prevent the iron or steel from oxidizing. The receptacle or crucible is heated until the temperature of the iron or steel body is raised to nearly the melting-point of the copper. At the same time a sufficient quantity of copper is placed in a suitable vessel or crucible and placed in the fire or furnace and melted. While in the molten state the scum or impurities therein may be gathered upon a rod for that purpose in a manner well known to those skilled in the art of metal-working. The copper being melted and the hammer-body being now ready to be united thereto, the two receptacles or crucibles are taken from the furnace and the hammer-body is quickly removed from its inclosure, and that part thereof which is to be welded to the copper is immediately plunged into or immersed in the molten copper. A small piece or portion of lead sufficient to cause the copper to solidify is then dropped into the crucible, or the lead may first be melted and poured into the vessel containing the molten copper, usually about one-fourth of an ounce of lead to one pound of copper. By putting this quantity of lead into the vessel after the hammer is placed in the molten copper the volatilization of the lead frees any sulfurous-acid gas from the copper, and the copper is thus purified and solidified. Charcoal and sand or other suitable heat-retaining medium may then be placed over the welded mass, so as to prevent too sudden cooling and allow the molecules of the two metals to unite more firmly. Thus covered the welded copper-faced body is allowed to gradually cool. As soon as the copper is solidified and cooled to the desired temperature the welded compound body may be removed from the crucible and at once rolled or otherwise shaped or worked into the desired form or may be stacked for further treatment.

In making a brass or bronze face weld we prepare an alloy, which may consist of two parts tin, one part zinc, one part lead, and from two to fourteen ounces of copper. The zinc, lead, and tin, melted and alloyed, are poured into the receptacle immediately after the hammer-body is placed in the molten copper, and the whole may then be covered up with charcoal and sand or other heat-retaining medium.

In preparing the body portion of the hammer for welding thereto the copper face, the part to which the copper is to be welded is preferably niched or otherwise roughened, so as to provide an irregular surface which will give the molecules of the copper and steel a better opportunity to lock and unite, similar to the welding of two pieces of iron at the blacksmith's forge.

Any suitable form or shape of crucible or other vessel for melting the copper and for raising the temperature of the steel or iron body may be employed in practicing our invention.

In the accompanying drawings, which form a part of this specification, we have illustrated several forms of crucibles suitable to be employed; but it will be understood, of course, that the size and shape of the crucible may be modified to suit different requirements in use and to adapt the crucible to the particular class or size of tool that is being manufactured.

Figure 4:
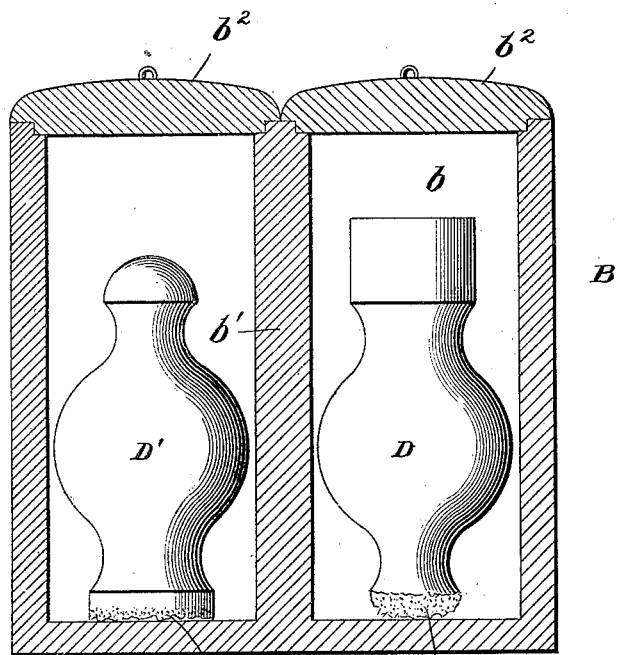

Referring to the drawings, in which similar letters of reference are used to denote corresponding parts of different views, Figure 1 is a sectional view of a suitable crucible to be employed for melting the copper, showing the hammer-body in side elevation with the portion thereof to which the copper face is to be welded partially immersed in the molten copper. Fig. 2 is a top plan view of the crucible shown in Fig. 1. Fig. 3 is a vertical sectional view through a crucible of the form shown in Fig. 1, showing in side elevation a sledge with its pendent portion to which the copper face is to be welded partially immersed in the molten copper. Fig. 4 is a vertical sectional elevation of a receptacle which may be used for heating a number of hammers, sledges, or other tools preparatory to welding the copper faces thereto. Fig. 5 is a plan view of a crucible having a plurality of receptacles into which molten copper may be poured preparatory to welding the hammer-body thereto.

In Fig. 1, A denotes the crucible, which is preferably formed of black-lead and which may be provided with a lining $a$ or a suitable wash to prevent the copper from penetrating into the walls of the crucible, this lining being adapted to be readily replaced for succeeding welds, or the receptacle may be composed wholly of cast-iron and lined with black-lead and clay. When made of cast-iron, it is placed in the fire or furnace and heated to a high heat while the copper is being melted in a large crucible, so that when the copper is poured into such receptacle the heat of the molten copper may be maintained and so as to prevent too-sudden chilling of the copper when poured into such receptacle or mold and to give the steel or iron body an opportunity to properly unite and weld.

B, Fig. 4, denotes a receptacle or crucible having two or more compartments $b$, separated by a suitable partition or wall $b'$ and provided with tight-fitting covers $b^2$, which may be formed of brick, or black-lead, or other suitable material to prevent the hammer or sledge bodies to be heated therein from oxidizing, while the partition $b'$ prevents the said bodies from coming into contact with each other.

In Fig. 5 is shown a cluster or nest of receptacles $c\ c$, formed in a suitable block or body C, which may be provided with suitable linings, as described with reference to Figs. 1, 2, and 3, the latter arrangement being used when it is desired to weld a number of hammers simultaneously. This receptacle or nest of receptacles $c$ is designed to be placed in the fire or furnace and heated to the desired temperature while the copper is being melted in a separate large crucible, to be subsequently poured into the receptacles $c$, the previously-prepared steel or iron bodies being thereafter partially immersed or plunged in the molten copper, as represented in Figs. 1 and 3.

D and D', Fig. 4, represent, respectively, a hammer and a sledge placed in the two compartments of the receptacle B, having a cover $b^2$ fitted thereon, in which condition the receptacle is placed in the fire or furnace, and the hammer and sledge bodies or other tools therein are heated to a temperature closely approximating the melting-point of the copper or alloy to which the body is to be welded.

E E, Figs. 1 and 3, denote molten copper contained within the crucibles A, which in this instance has been melted by placing the crucibles in the fire or furnace or otherwise applying heat thereto until the copper is melted, whereupon the crucible is removed from the furnace, and the scum or impurities being taken off in a manner well known to those skilled in the art of metal-working the molten copper is then in condition to be welded to the iron or steel bodies D and D', which are shown in elevation with their roughened portions $d$ immersed in the molten metal. When so immersed, a small quantity of lead, either in a liquid or solid state, is dropped into the molten copper, so as to free the copper from sulfurous-acid gas by the volatilization of the lead, which purifies the copper, so that it will form a good and solid face or surface to the iron or steel body.

In order to properly seat and balance the steel or iron body in the receptacle and to limit the extent of penetration into the copper, the upper edge of the receptacle or crucible A may be beveled or rounded, as at $a'$, so as to cause the steel body to fit snugly thereon and to be exactly adjusted in position to form the desired weld in proper relation thereto. The copper having been thus solidified, the whole is covered with charcoal and sand or other heat-retaining substance, so as to prevent too sudden cooling and to allow the two metals to unite more firmly. It is desirable that there should be sufficient surplus of copper to rise above the abutting points of the molten metal and steel body, as shown in Figs. 1 and 2, in order that impurities may be expelled from the surface of the copper some distance above the welding-line, so as to prevent any such impurities resting against the abutting surface of the steel or iron body.

In making a number of welds we prepare a number of receptacles, as illustrated, for example, in Fig. 5 of the drawings, wherein is shown a body or block C, having four receptacles c, which may be of substantially the form of the individual receptacles (shown in Figs. 1, 2, and 3) or of such shape as may be desired to suit the particular style or size of hammer, sledge, or other tool upon which the copper face is to be welded. These receptacles c may have suitable linings or not, as may be most desirable in practice, and are of such size and depth as to hold the desired quantity of copper necessary to form the copper face for the tool to which it is to be welded. In using this nest of receptacles the copper is first melted in a crucible of sufficient size to hold enough copper to supply the number of receptacles to be filled. Preparatory to pouring the copper into such receptacles from the containing-crucible the body or block composing the nest is placed in the furnace or otherwise subjected to heat, so as to raise its temperature to a high degree, at least as great as the temperature of the melting-point of the copper. When ready for filling, the nest of receptacles or multiple crucible, Fig. 5, is placed in a convenient and proper position to receive the melted copper, which is poured into the receptacles thereof, and the previously-heated hammer, sledge, or other steel or iron bodies are each placed in one of the receptacles with their roughened portions immersed in the melted copper in the manner shown in Figs. 1 and 3, whereupon fine charcoal and sand or other heat-retaining medium may be placed thereon, so as to cover the same and permit it to gradually cool, a small quantity of lead being first introduced, as hereinbefore described, into the melted copper in each of the receptacles to cause the copper to solidify and to free the same from any sulfurous-acid gas by the volatilization of the lead.

The improved process is especially designed for welding copper and brass or other alloyed faces onto the iron or steel bodies of hammers, sledges, and the like; but it will be understood, of course, that the application of the invention is not restricted to any particular class of tools and is capable of general application.

Having thus fully described our invention, what we claim as new, and desire to secure by Letters Patent of the United States, is—

1. The process of welding to steel or iron bodies of hammers and similar tools, softer-metal faces or impact-surfaces of copper or alloys of copper and brass, which consists in heating the less-fusible body while air is excluded from it until its temperature is nearly or quite at the fusing-point of the softer and more-fusible metal to be welded thereto, immersing or submerging that part of the body on which the face is to be welded in a quantity of molten copper or alloy of softer metal sufficient to form the required face, maintaining said body in a fixed position relatively to the molten metal during the welding process, freeing the molten metal of sulfurous-acid gas and solidifying it while said body is maintained in proper position relatively thereto, then covering the united body and solidified face with a heat-retaining medium so as to cause the whole to cool, thereby permitting the harder and softer metals to become firmly knit together and form a homogeneous union, substantially as described.

2. The improved process of welding metals of different fusing-points, the same consisting in fusing the metal having the lower fusing-point, inclosing the metal having the higher fusing-point to the exclusion of air and products of combustion, heating the same while thus inclosed to approximately the temperature of the fused or molten metal, immersing in the molten metal whatever portion of the thus-heated unfused metal is to receive the weld, freeing the molten metal of sulfurous-acid gas and solidifying it, and finally covering the united body and solidified face with a heat-retaining medium, substantially as and for the purpose described.

In testimony whereof we affix our signatures in presence of two witnesses.

JOSEPH WILLIAM COMLEY.
ROBERT WALLACE COMLEY.
CHARLES HENRY LARGE COMLEY.

Witnesses:
HARRY M. EVANS,
CHARLS C. MEREDITH.